(12) United States Patent
Batra et al.

(10) Patent No.: US 10,070,247 B2
(45) Date of Patent: Sep. 4, 2018

(54) SYSTEMS AND METHODS FOR CONNECTION CREATION

(71) Applicant: QUALCOMM Incorporated, San Diego, CA (US)

(72) Inventors: Mayank Batra, Cambridge (GB); Robin Heydon, Cambridge (GB)

(73) Assignee: QUALCOMM Incorporated, San Diego, CA (US)

( * ) Notice: Subject to any disclaimer, the term of this patent is extended or adjusted under 35 U.S.C. 154(b) by 32 days.

(21) Appl. No.: 15/098,942

(22) Filed: Apr. 14, 2016

(65) Prior Publication Data

US 2017/0303070 A1 Oct. 19, 2017

(51) Int. Cl.
- H04B 7/00 (2006.01)
- H04W 4/00 (2018.01)
- H04W 76/02 (2009.01)

(52) U.S. Cl.
CPC ......... *H04W 4/008* (2013.01); *H04W 76/023* (2013.01); *H04W 76/027* (2013.01); *H04W 76/028* (2013.01)

(58) Field of Classification Search
CPC ..... H04W 8/005; H04W 48/16; H04B 17/318
See application file for complete search history.

(56) References Cited

U.S. PATENT DOCUMENTS

| | | |
|---|---|---|
| 8,155,055 B2 | 4/2012 | Haartsen et al. |
| 8,170,480 B1 | 5/2012 | Kammer et al. |
| 2005/0018631 A1 | 1/2005 | Sivakumar et al. |
| 2013/0003715 A1* | 1/2013 | Xhafa ............... H04W 52/0229 370/349 |
| 2013/0201915 A1* | 8/2013 | Wang ..................... H04W 24/10 370/328 |
| 2014/0357194 A1* | 12/2014 | Jin ......................... H04W 8/005 455/41.2 |
| 2014/0378058 A1 | 12/2014 | Decuir et al. |
| 2016/0212194 A1* | 7/2016 | Palin ..................... G06F 3/0484 |
| 2016/0278006 A1* | 9/2016 | Lee ........................ H04W 12/00 |
| 2016/0323012 A1* | 11/2016 | Kwon .................. H04B 1/7143 |
| 2016/0336984 A1* | 11/2016 | Demay .................. H04B 1/123 |

FOREIGN PATENT DOCUMENTS

| | | |
|---|---|---|
| EP | 2713661 A2 | 4/2014 |
| EP | 2887747 A1 | 6/2015 |

OTHER PUBLICATIONS

International Search Report and Written Opinion—PCT/US2017/019752—ISA/EPO—dated May 23, 2017.

* cited by examiner

*Primary Examiner* — Edward Urban
*Assistant Examiner* — Max Mathew
(74) *Attorney, Agent, or Firm* — Austin Rapp (57) ABSTRACT

A method for wireless communication by an advertising Bluetooth (BT) device is described. The method includes detecting an energy level that indicates a corrupt connection request sent by a remote BT device. The method also includes determining that there is a failed connection attempt based on the corrupt connection request. The method further includes performing connectable advertising at a faster rate to allow the remote BT device to reconnect quickly.

25 Claims, 9 Drawing Sheets

SYSTEMS AND METHODS FOR CONNECTION CREATION

TECHNICAL FIELD

The present disclosure relates generally to communications. More specifically, the present disclosure relates to systems and methods for connection creation.

BACKGROUND

In the last several decades, the use of electronic devices has become common. In particular, advances in electronic technology have reduced the cost of increasingly complex and useful electronic devices. Cost reduction and consumer demand have proliferated the use of electronic devices such that they are practically ubiquitous in modern society. As the use of electronic devices has expanded, so has the demand for new and improved features of electronic devices. More specifically, electronic devices that perform new functions and/or that perform functions faster, more efficiently or more reliably are often sought after.

Some electronic devices communicate with other electronic devices. These electronic devices may transmit and/or receive electromagnetic signals. For example, a smartphone may transmit signals to and/or receive signals from another device (e.g., a laptop computer, an electronics console in a vehicle, a wireless headset, etc.). In another example, a wireless headset may transmit signals to and/or receive signals from another device (e.g., a laptop computer, a game console, a smartphone, etc.).

However, particular challenges arise in wireless communications. For example, some wireless devices may perform connectable advertising in order to create a connection with a remote device. However, a connection request from one or more remote devices may be corrupt. This may lead to increased connection time. Therefore, systems and methods for enhanced connection creation may be beneficial.

SUMMARY

A method for wireless communication by an advertising Bluetooth (BT) device is described. The method includes detecting an energy level that indicates a corrupt connection request sent by a remote BT device. The method also includes determining that there is a failed connection attempt based on the corrupt connection request. The method further includes performing connectable advertising at a faster rate to allow the remote BT device to reconnect quickly.

The connection request may be made on a Bluetooth low energy primary advertising channel. The connection request may be made on a Bluetooth low energy secondary advertising channel.

Detecting an energy level that indicates a corrupt connection request may include detecting an energy level that indicates that a corrupt CONNECT_REQ or AUX_CONNECT_REQ packet was sent by the remote BT device. The presence of an CONNECT_REQ or AUX_CONNECT_REQ packet may be determined based on a fixed duration of the CONNECT_REQ or AUX_CONNECT_REQ packet.

Determining that there is a failed connection attempt may further include establishing an access address lock on a connection request packet received from the remote BT device. The advertising BT device may fail to match a cyclic redundancy check (CRC) for the connection request packet.

The connection request sent by the remote BT device may be corrupt because of interference due to another connection request received from a second remote BT device.

Performing connectable advertising at a faster rate may include sending at least one advertising packet for a connection at a faster rate. The advertising BT device may send one or more of an ADV_EXT_IND packet on a primary advertising channel or an AUX_ADV_IND packet on a secondary advertising channel at a faster rate. The connectable advertising may be performed at the faster rate for a limited period of time.

The method may also include avoiding using a frequency on which connection creation failed. The method may also include adjusting a receiver gain parameter to increase the probability of detecting subsequent connection requests.

An advertising Bluetooth (BT) device is also described. The advertising BT device includes a processor and a memory in electronic communication with the processor, and instructions stored in the memory. The instructions are executable by the processor to detect an energy level that indicates a corrupt connection request sent by a remote BT device. The instructions are also executable to determine that there is a failed connection attempt based on the corrupt connection request. The instructions are further executable to perform connectable advertising at a faster rate to allow the remote BT device to reconnect quickly.

An apparatus for wireless communication is also described. The apparatus includes means for detecting an energy level that indicates a corrupt connection request sent by a remote BT device. The apparatus also includes means for determining that there is a failed connection attempt based on the corrupt connection request. The apparatus further includes means for performing connectable advertising at a faster rate to allow the remote BT device to reconnect quickly.

A computer-program product for wireless communication by an advertising Bluetooth (BT) device is also described. The computer-program product includes a non-transitory computer-readable medium having instructions thereon. The instructions include code for causing the advertising BT device to detect an energy level that indicates a corrupt connection request sent by a remote BT device. The instructions also include code for causing the advertising BT device to determine that there is a failed connection attempt based on the corrupt connection request. The instructions further include code for causing the advertising BT device to perform connectable advertising at a faster rate to allow the remote BT device to reconnect quickly.

DETAILED DESCRIPTION

The systems and methods described herein may be implemented on a variety of different electronic devices. Examples of electronic devices include general purpose or special purpose computing system environments or configurations, personal computers (PCs), server computers, handheld or laptop devices, multiprocessor systems, microprocessor-based systems, programmable consumer electronics, network PCs, minicomputers, mainframe computers, distributed computing environments that include any of the above systems or devices and the like. The systems and methods may also be implemented in mobile devices such as phones, smartphones, wireless headsets, personal digital assistants (PDAs), ultra-mobile personal computers (UM-PCs), mobile Internet devices (MIDs), etc. Further, the systems and methods may be implemented by battery-operated devices, sensors, etc. The following description refers to wireless communication devices for clarity and to facilitate explanation. Those of ordinary skill in the art will understand that a wireless communication device may comprise any of the devices described above as well as a multitude of other devices.

The Bluetooth (BT) wireless communication standard is typically employed for exchanging communications between fixed or mobile Bluetooth-enabled devices over short distances. In some configurations, the systems and methods disclosed herein may be applied to establishing connections between Bluetooth-enabled devices configured to operate according to Bluetooth low energy (BLE) standards.

LE refers to the "Low Energy" extension of the Bluetooth standard. The BLE extension is focused on energy-constrained applications such as battery-operated devices, sensor applications, etc. The following description uses terminology associated with the Bluetooth and Bluetooth LE standards. Nevertheless, the concepts may be applicable to other technologies and standards that involve modulating and transmitting digital data. Accordingly, while some of the description is provided in terms of Bluetooth standards, the systems and methods disclosed herein may be implemented more generally in wireless communication devices that may not conform to Bluetooth standards.

A BT device may comprise a transmitter, a receiver, or both a transmitter and a receiver. A BT device may also use a frequency-hopping transceiver to combat interference and fading.

BLE systems operate in the unlicensed 2.4 gigahertz (GHz) Industrial-Scientific-Medical (ISM) band at 2.400-2.4835 GHz (2400-2483.5 megahertz (MHz)). The operating frequency bands of BLE systems are illustrated in Equation (1). In particular, BLE systems use forty radio frequency (RF) channels with center frequencies (f) as illustrated in Equation (1).

$$f = 2402 + k \times 2 \text{ MHz}; k=0, \ldots, 39 \qquad (1)$$

As part of the device discovery and connection setup procedure, an advertising BT device may transmit advertisement packets on advertising channels. A remote BT device may perform periodic scans on the advertising channels to detect these advertisement packets.

The 2.4 GHz unlicensed band has many technologies that operate simultaneously. For example, wireless local area network (WLAN) is popular and presents a major source of interference for BLE operations. The BLE advertising channels overlap with one or more WLAN channels. Additionally, multiple remote BT devices may respond to the same advertising packet sent by the advertising BT device. Thus, multiple remote BT devices may try to send connection requests at the same time, resulting in collisions. This channel overlap and interference may reduce the probability of detecting a connection request on a channel where the interference exists. This in general has an impact where time taken to discover a BLE peripheral is longer. This impact may be noticeable to a user and may cause an inconsistent and bad user experience.

The systems and methods disclosed herein provide for enhanced connection creation with BLE communication. An advertising BT device may determine that there is a failed connection attempt by a remote BT device. The advertising BT device may then perform one or more actions to allow the remote BT device to reconnect quickly.

Various configurations are described with reference to the Figures, where like reference numbers may indicate functionally similar elements. The systems and methods as generally described and illustrated in the Figures could be arranged and designed in a wide variety of different configurations. Thus, the following more detailed description of several configurations, as represented in the Figures, is not intended to limit scope, but is merely representative.

Figure 1:
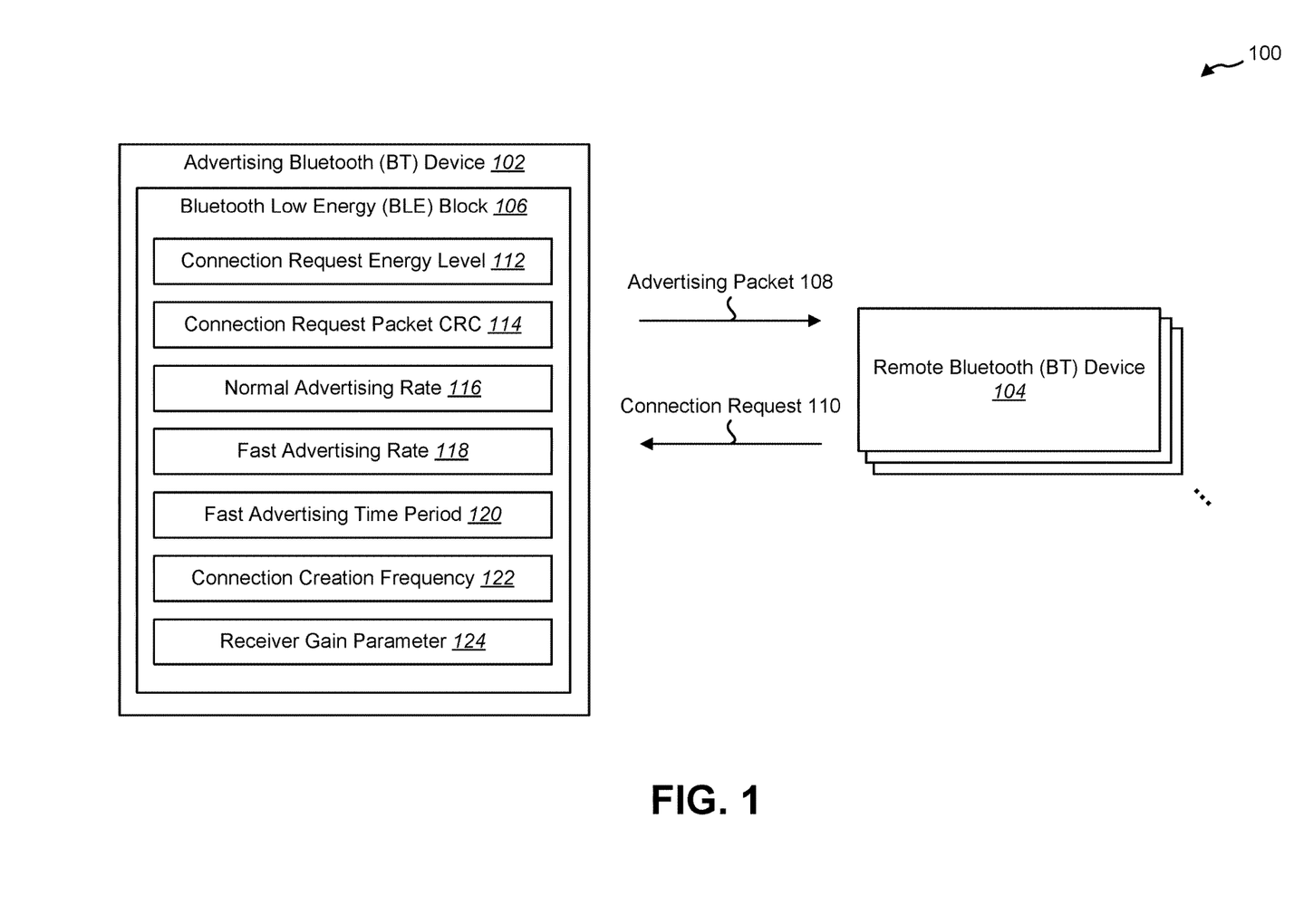
FIG. 1 is a block diagram illustrating an advertising Bluetooth (BT) device in which enhanced connection creation may be implemented.

FIG. 1 is a block diagram illustrating an advertising Bluetooth (BT) device 102 in which enhanced connection creation may be implemented. The advertising BT device 102 may be included in a wireless communication system 100. Wireless communication systems 100 are widely deployed to provide various types of communication content such as voice, data and so on.

Communications in the wireless communication system 100 may be achieved through transmissions over a wireless link. Such a wireless link may be established via a single-input and single-output (SISO), multiple-input and single-output (MISO) or a multiple-input and multiple-output (MIMO) system. A MIMO system includes transmitter(s) and receiver(s) equipped, respectively, with multiple ($N_T$) transmit antennas and multiple ($N_R$) receive antennas for data transmission. In some configurations, the wireless communication system 100 may utilize MIMO. A MIMO system may support time division duplex (TDD) and/or frequency division duplex (FDD) systems.

In some configurations, the wireless communication system 100 may operate in accordance with one or more standards. Examples of these standards include Bluetooth (e.g., Institute of Electrical and Electronics Engineers (IEEE) 802.15.1), Bluetooth low energy (BLE), IEEE 802.11 (Wi-Fi), IEEE 802.16 (Worldwide Interoperability for Microwave Access (WiMAX), Global System for Mobile Communications (GSM), Universal Mobile Telecommunications System (UMTS), CDMA2000, Long Term Evolution (LTE), etc. Accordingly, the advertising BT device 102 may communicate with a remote BT device 104 using a communication protocol such as BLE in some configurations.

In some configurations, the wireless communication system 100 may be a multiple-access system capable of supporting communication with multiple wireless communication devices by sharing the available system resources (e.g., bandwidth and transmit power). Examples of such multiple-access systems include code division multiple access (CDMA) systems, wideband code division multiple access (W-CDMA) systems, time division multiple access (TDMA) systems, frequency division multiple access (FDMA) systems, orthogonal frequency division multiple access (OFDMA) systems, evolution-data optimized (EV-DO) systems, single-carrier frequency division multiple access (SC-FDMA) systems, General Packet Radio Service (GPRS) access network systems, 3rd Generation Partnership Project (3GPP) Long Term Evolution (LTE) systems, and spatial division multiple access (SDMA) systems.

In LTE and UMTS, a wireless communication device may be referred to as a "user equipment" (UE). In 3GPP Global System for Mobile Communications (GSM), a wireless communication device may be referred to as a "mobile station" (MS). The advertising BT device 102 and/or remote BT device 104 may be referred to as and/or may include some or all of the functionality of a UE, MS, terminal, an access terminal, a subscriber unit, a station, etc. Examples of the advertising BT device 102 include cellular phones, smartphones, wireless headsets, wireless speakers, personal digital assistants (PDAs), wireless devices, electronic automobile consoles, gaming systems, wireless controllers, sensors, wireless modems, handheld devices, laptop computers, Session Initiation Protocol (SIP) phones, wireless local loop (WLL) stations, wearable devices, smart watches, etc.

In an implementation, the advertising BT device 102 may communicate with one or more remote BT devices 104 using BLE. The advertising BT device 102 may perform BLE advertising in order to establish connections. In BLE, advertising may allow a remote BT device 104 to create a connection on a primary or a secondary advertising channel. The advertising extension of BLE enhances the advertising of BLE. The advertising extension introduced secondary advertising channels, ADV_EXT_IND, ADV_AUX_IND, AUX_CONNECT_REQ and AUX_CONNECT_RSP packets.

As used herein, an advertising BT device 102 may also be referred to as an advertiser or advertiser device. A remote BT device 104 may also be referred to as a scanner or initiator.

The advertising BT device 102 may include a BLE block 106. With the proliferation of BLE technology, many BLE-based devices are becoming popular. Examples of devices that use BLE include wearables (e.g., fitness trackers, smartwatches) and various sensor devices. In an implementation, the advertising BT device 102 may be a wearable device. The remote BT device 104 may be a smartphone that connects to the advertising BT device 102.

In a BLE connection (e.g., a BLE connection between a wearable and a smartphone), the advertising BT device 102 (e.g., wearable device) may take up role of a BLE peripheral (and slave). The remote BT device 104 (e.g., smartphone) may take up role of a BLE central (and master).

As part of the device discovery and connection setup procedure, the advertising BT device 102 transmits advertising packets 108 on BLE advertising channels. The remote BT device 104 does periodic scans on the BLE advertising channels to detect these advertising packets 108.

Figure 3:
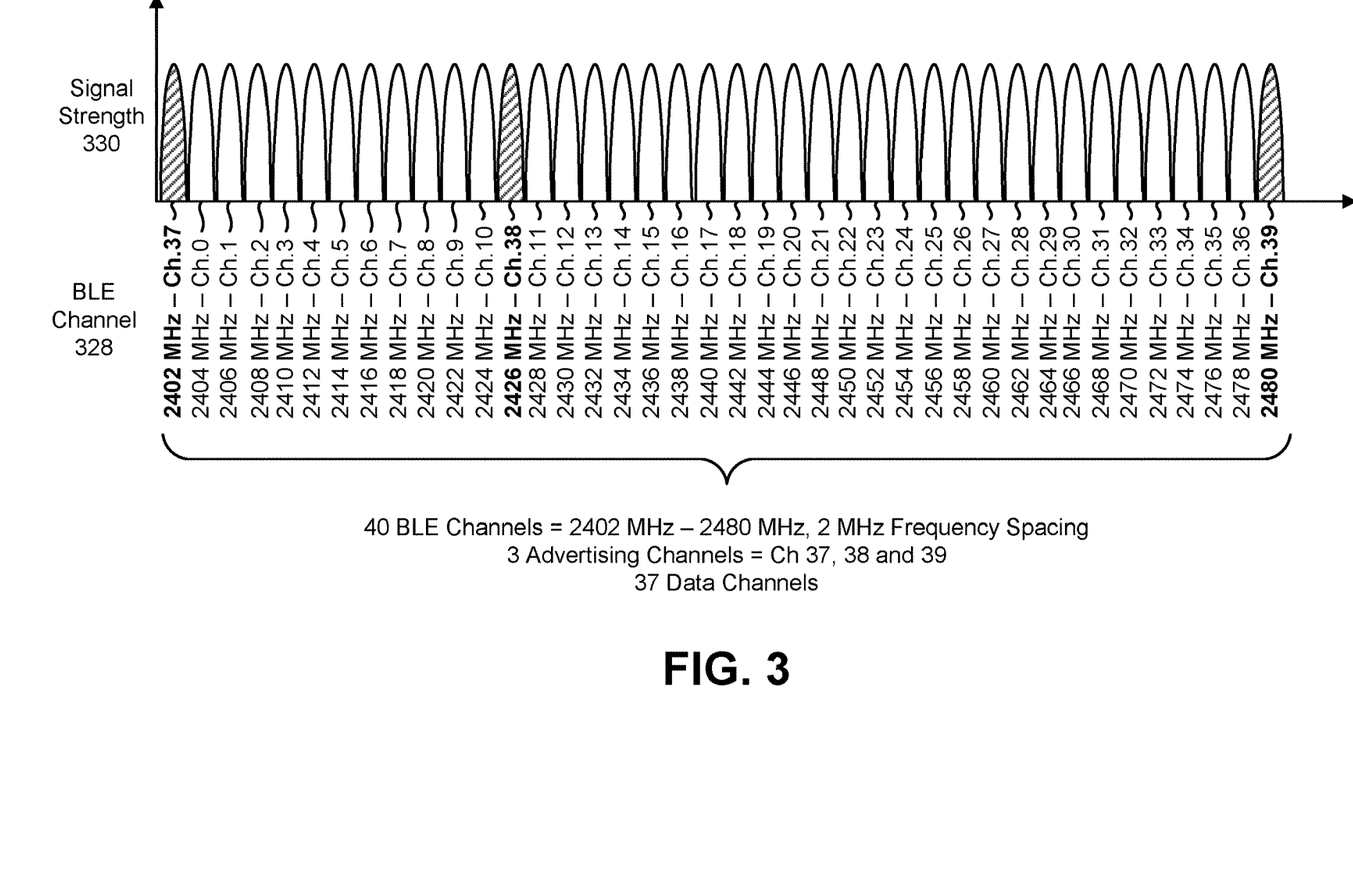
FIG. 3 is a diagram illustrating a channel spectrum map of BLE channels.

The Bluetooth specification provides for BLE peripherals to transmit advertisement packets on primary advertising channels and secondary advertising channels. There are three specified primary advertising channels: channel 37, 38 and 39. The remaining data channels may be used for secondary advertising channels. The channel spectrum map of FIG. 3 provides a detailed picture of how the 2.4 GHz band is broken up into BLE primary advertising channels and BLE data channels. The secondary advertising channels may be used to reduce congestion on the primary advertising channels.

When a BLE peripheral (e.g., the advertising BT device 102) transmits advertising packets 108, it transmits back-to-back on BLE advertising channel 37, 38 and 39. Packets sent on BLE advertising channels 37, 38 and 39 constitute an advertising event. The gap between the start of two consecutive advertising events is the advertising interval.

On the BLE central (e.g., the remote BT device 104), there are two governing time parameters: the scan window and scan interval. The scan window determines how long the receiver should scan on a BLE primary advertising channel and the scan interval determines how often the scan needs to be done. The scan window and scan interval times are set by higher layers.

The BLE central will scan on one BLE primary advertising channel for the period of the scan window and then every scan interval it will move to another BLE primary advertising channel. It should be noted that the scanning of the BLE primary advertising channels does not need to be in order.

To establish a connection on the BLE primary advertising channel, the advertising BT device 102 may send an advertising packet 108 on a primary advertising channel. For example, the advertising BT device 102 may send an ADV_IND packet on one or more of the three BLE advertising channels (e.g., channels 37, 38 and 39). A remote BT device 104 (i.e., scanner) may scan the primary advertising channels at a particular interval until it receives the ADV_IND packet.

Figure 4:
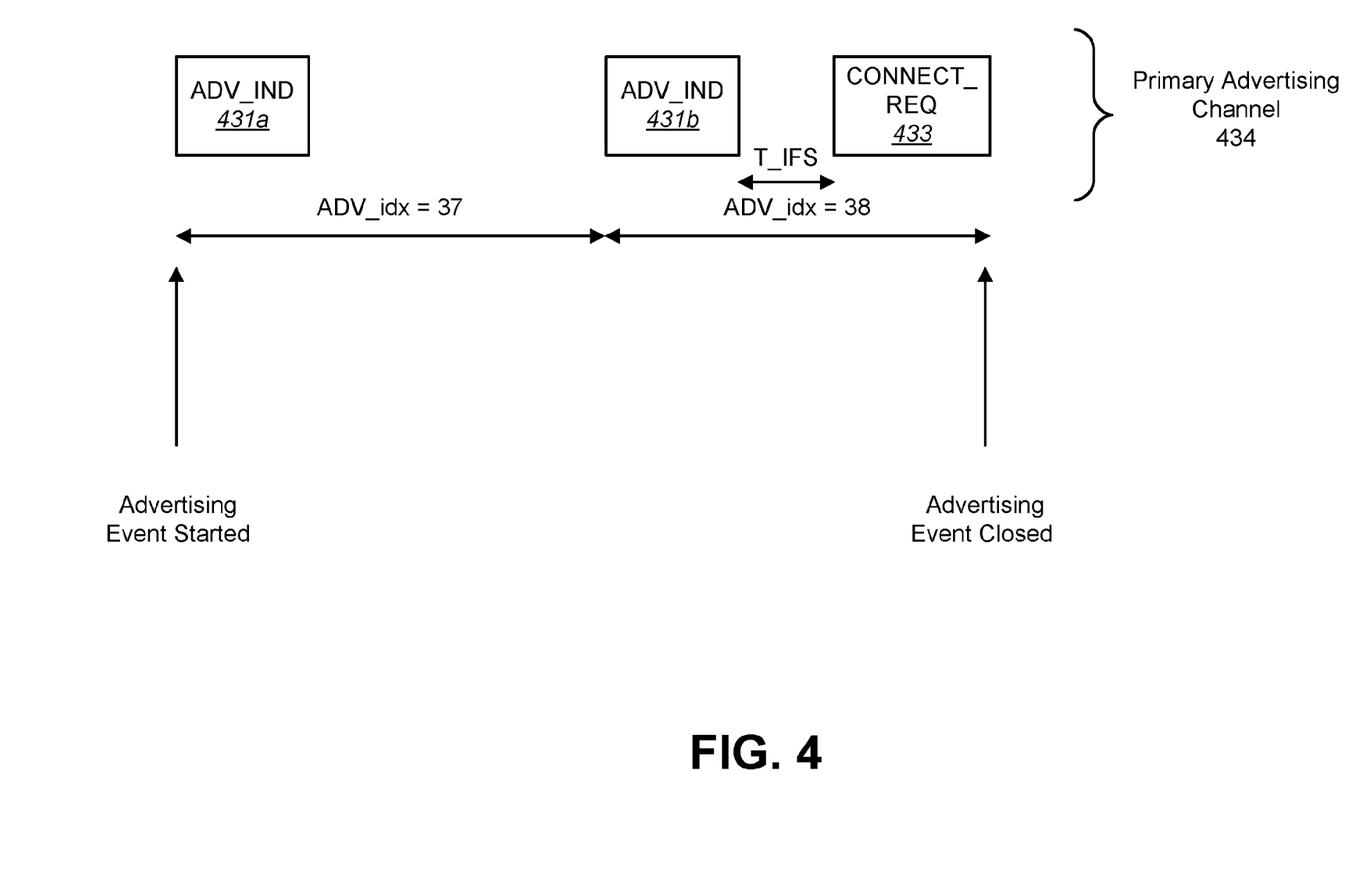
FIG. 4 is a diagram illustrating a packet exchange for BLE connection creation on a primary advertising channel.

Upon receiving an ADV_IND packet, the remote BT device 104 may send a connection request 110. For example, the remote BT device 104 may send a CONNECT_REQ packet to the advertising BT device 102. When the advertising BT device 102 receives the CONNECT_REQ packet, the advertising BT device 102 may transition to a connection state in the slave role. FIG. 4 illustrates the sequence of packets that may be exchanged to create a BLE primary advertising channel connection.

To establish a connection on the BLE secondary advertising channel, the advertising BT device 102 may first send an advertising packet 108 on a primary advertising channel. For example, the advertising BT device 102 may send an ADV_EXT_IND packet on one or more of the three BLE advertising channels (e.g., channels 37, 38 and 39). A remote BT device 104 (i.e., scanner) may scan the primary advertising channels at a particular interval until it receives the ADV_EXT_IND packet.

The ADV_EXT_IND packet may point to an AUX_ADV_IND packet on the secondary advertising channel (e.g., data channels 0-36). For example, the ADV_EXT_IND packet may contain an AuxPtr field in an extended header containing the frequency and time of an AUX_ADV_IND packet. The extended header of the AUX_ADV_IND packet may contain a SyncInfo field with the information of the frequency, time, interval and channel map among other information of the advertisement.

The remote BT devices 104 may receive the advertising packet 108 and can respond with a connection request 110. For example, the remote BT device 104 may listen for the ADV_EXT_IND packet on the primary advertising channel and follows it to find the AUX_ADV_IND packet. Upon receiving the AUX_ADV_IND packet, the remote BT device 104 may respond by sending an AUX_CONNECT_REQ packet to the advertising BT device 102.

Figure 5:
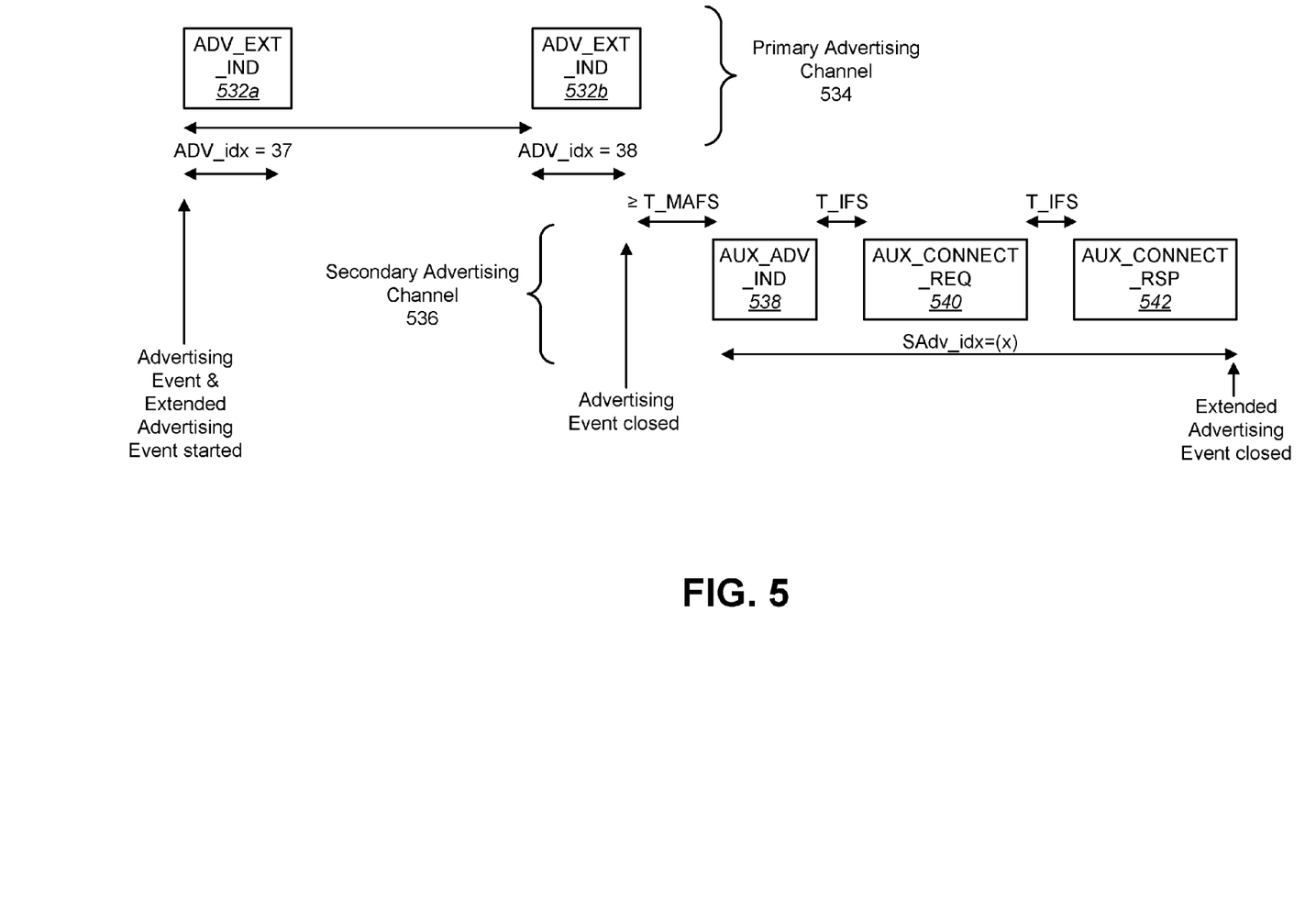
FIG. 5 is a diagram illustrating a packet exchange for BLE connection creation.

Upon receiving a valid connection request 110, the advertising BT device 102 may send a connection response. For example, in a BLE secondary advertising channel, the advertising BT device 102 may send an AUX_CONNECT_RSP packet. The advertising BT device 102 and remote BT device 104 then establish a BLE connection based on information included in the connection request 110 and the connection response. FIG. 5 illustrates the sequence of packets that may be exchanged to create a BLE secondary advertising channel connection.

It should be noted that connection creation in BLE differs from standard Bluetooth connections. For example, standard Bluetooth does not perform advertising. Instead, standard Bluetooth utilizes an inquiry procedure and paging procedure to establish connections. For example, in standard Bluetooth, a master device discovers which other devices are within range using the inquiry procedure where the master device transmits inquiries and listens for a slave device response. The master device then pages the slave device and waits for the slave device to respond to the page.

In BLE, on the other hand, the slave device sends out advertising packets 108. The master device discovers the slave device based on these adverting packets 108 and creates a connection as described above.

Problems may occur in BLE connection creation when multiple remote BT devices 104 send connection requests 110 (e.g., CONNECT_REQ or AUX_CONNECT_REQ packets) at the same time. In this case, the advertising BT device 102 might not be able to receive any of the connection requests 110 properly. In other words, there can be collisions in connection requests 110. A connection request 110 sent by a first remote BT device 104 may be corrupt because of interference due to another connection request 110 received from a second remote BT device 104.

When a remote BT device 104 fails to receive a connection response from the advertising BT device 102, the remote BT device 104 may perform a random backoff procedure. This may involve waiting a random period of time before attempting to send another connection request 110 to the advertising BT device 102. The remote BT device 104 may then retry sending another connection request 110 (e.g., CONNECT_REQ or AUX_CONNECT_REQ packet) until one eventually gets through.

Therefore, the advertising BT device 102 might not transmit an AUX_CONNECT_RSP packet because the advertising BT device 102 did not hear the AUX_CONNECT_REQ from any of the remote BT devices 104. This will lead to long connection creation times, which may result in increased power consumption and a poor user experience.

The systems and methods described herein provide for enhanced connection creation. The advertising BT device 102 may determine that a remote BT device 104 is trying to connect to it but either failed to do so or was unable to complete the transaction. The advertising BT device 102 may perform one or more actions that will allow the advertising BT device 102 to reconnect quickly.

The advertising BT device 102 may send one or more advertising packets 108. In response to sending the advertising packets 108, the advertising BT device 102 may detect that something is trying to connect to it. In an implementation, a connection request 110 may be made on a Bluetooth low energy primary advertising channel. In another implementation, a connection request 110 may be made on a Bluetooth low energy secondary advertising channel. As described above, the connection request 110 sent by the remote BT device 104 may be corrupt because of interference due to another connection request 110 received from a second remote BT device 104. This may result in a failed connection attempt.

In an implementation, the advertising BT device 102 may determine that there is a failed connection attempt by a remote BT device 104 by detecting a connection request energy level 112 that indicates a corrupt connection request 110 sent by a remote BT device 104. For example, the advertising BT device 102 may detect an energy level that appears to be a corrupt connection request 110 sent by a remote BT device 104. If the received signal level on a frequency is above the noise level by a certain threshold, then that amounts to detection of a corrupt connection request 110. The connection request 110 is fixed in duration so that fact can also be used to determine if the received signal was a corrupt connection request 110 or not.

In the case of BLE, the advertising BT device 102 may detect an energy level that appears to be a CONNECT_REQ packet or an AUX_CONNECT_REQ packet. This may be accomplished because the duration of the CONNECT_REQ packet and AUX_CONNECT_REQ packet is fixed. For example, because there is a detected energy level that corresponds to the timing of an AUX_CONNECT_REQ packet, the advertising BT device 102 may determine that there is a corrupt connection request 110. Upon detecting the presence of a corrupt connection request 110, the advertising BT device 102 may determine that there is a failed connection attempt.

In another implementation, the advertising BT device 102 may determine the presence of a failed connection attempt based on a connection request packet cyclic redundancy check (CRC) 114. For example, the advertising BT device 102 may establish an access address lock on a connection request 110 packet received from the remote BT device 104. However, the advertising BT device 102 may fail to match a CRC for the connection request 110 packet.

Upon determining that there is a failed connection attempt by a remote BT device 104, the advertising BT device 102 may perform one or more actions to allow the remote BT device 104 to reconnect quickly. In an implementation, the advertising BT device 102 may perform connectable advertising at a faster rate to allow the remote BT device 104 to reconnect quickly. This may include sending at least one advertising packet 108 for a connection at a faster rate.

In an implementation, the advertising BT device 102 may switch from a normal advertising rate 116 to a fast advertising rate 118. In one approach, the advertising BT device 102 may transmit one or more of an ADV_EXT_IND packet on a primary advertising channel at a faster rate. In another approach, the advertising BT device 102 may transmit one or more of an AUX_ADV_IND packet on a secondary advertising channel at a faster rate. In another approach, the advertising BT device 102 may transmit both the ADV_EXT_IND packet and the AUX_ADV_IND packet at a faster rate. In yet another approach, the advertising BT device 102 may transmit one or more of an ADV_IND packet on a primary advertising channel at a faster rate.

By advertising at the fast advertising rate 118, the advertising BT device 102 may provide more opportunities for the remote BT device 104 to connect to it. This may lead to faster connection creation.

Advertising at the fast advertising rate 118 could be performed for a limited period of time to save power. Because increasing the advertising packet 108 transmission rate also increases power consumption, the advertising BT device 102 may limit the fast advertising rate 118 to a certain fast advertising time period 120. Upon expiration of the fast advertising time period 120, the advertising BT device 102 may return to the normal advertising rate 116. This may be beneficial in cases where there is a false positive for a failed connection attempt or the remote BT device 104 has gone away.

In another implementation, the advertising BT device 102 may avoid using the frequency 122 on which connection creation failed. A failed connection attempt determination may indicate that there is interference on a particular connection creation frequency 122 (e.g., the secondary advertising channel). Upon determining that there is a failed connection attempt, the advertising BT device 102 may avoid the connection creation frequency 122 for subsequent connection creation attempts. This may include switching the connection creation frequency 122 that is indicated by the ADV_IND or ADV_EXT_IND packet on the primary advertising channel. The advertising BT device 102 may limit the amount of time that the connection creation frequency 122 is avoided.

In yet another implementation, the advertising BT device 102 may adjust a receiver gain parameter 124 to increase the probability of detecting subsequent connection requests 110. For example, the advertising BT device 102 may temporarily increase the gain of a BT receiver to increase the likelihood that a connection request 110 sent by the remote BT device 104 is correctly received. Because this may increase power consumption, the advertising BT device 102 may limit the amount of time that the receiver gain is increased.

The benefits of the described systems and methods include faster discovery and connection time. The advertising BT device 102 is able to connect to a remote BT device 104 like a smartphone in a shorter time. As soon as a failed connection attempt is detected, an accelerated reconnection procedure may be initiated. This may cut down the time to create connections, which makes the overall discovery process more power efficient.

Additionally, the described systems and methods may provide a consistent user experience. Having the advertising BT device 102 quickly establish connections with the remote BT device 104 will ensure that user experience remains consistent across both non-interference scenarios and in the presence of interference.

While an example for connection creation has been described in terms of BLE, the systems and methods described herein may be used in other communication technologies. Furthermore, although FIG. 1 depicts an advertising BT device 102 with a BLE block 106, the advertising BT device 102 may comprise other components not illustrated in FIG. 1. Those skilled in the art will understand that the advertising BT device 102 of FIG. 1 has been simplified to facilitate explanation.

Figure 2:
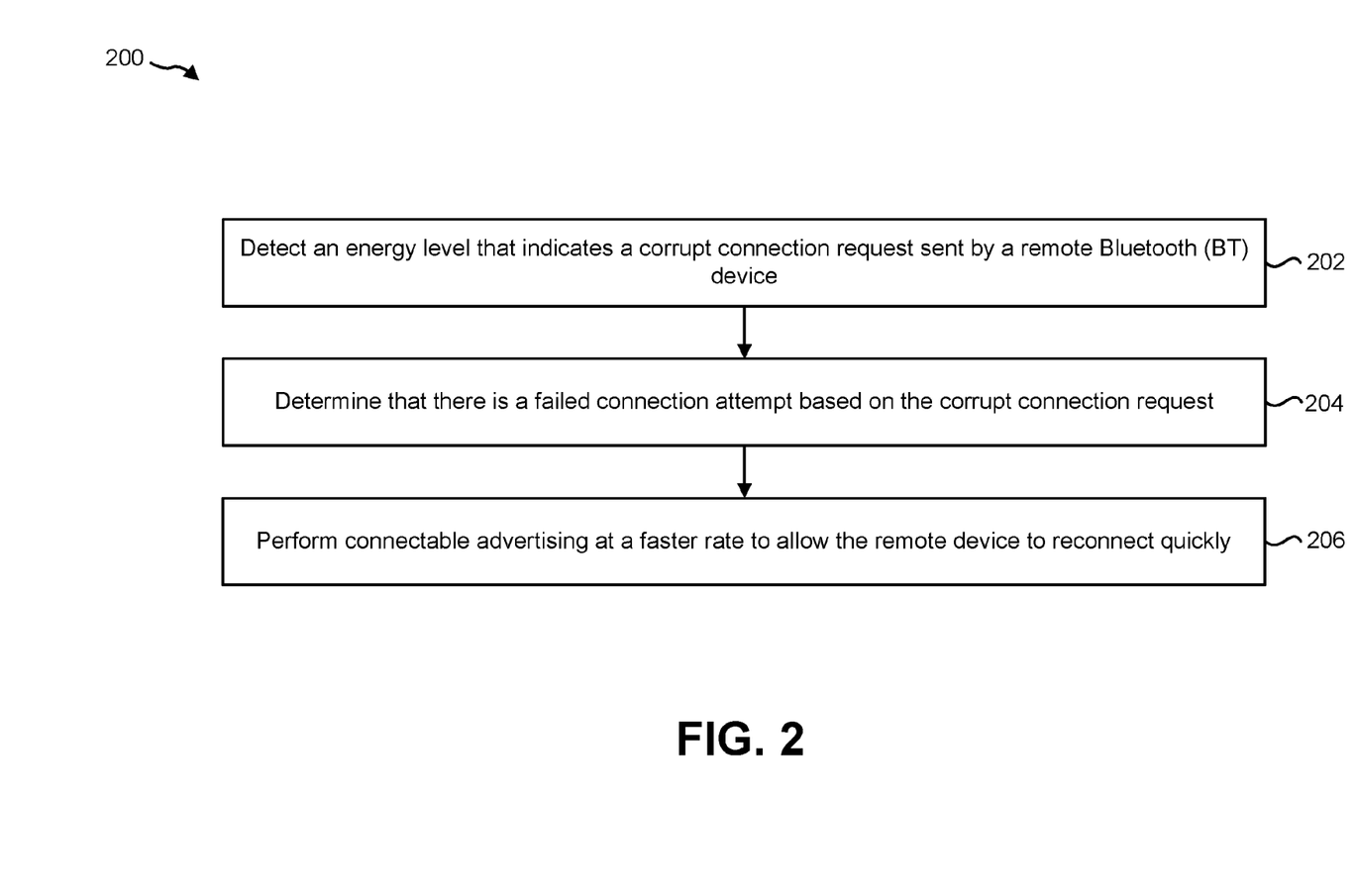
FIG. 2 is a flow diagram illustrating one configuration of a method for wireless communication by an advertising BT device.

FIG. 2 is a flow diagram illustrating one configuration of a method 200 for wireless communication by an advertising Bluetooth (BT) device 102. In an implementation, the advertising BT device 102 may be configured to communicate according to BLE protocols. For example, the advertising BT device 102 may include a BLE block 106.

The advertising BT device 102 may detect 202 an energy level that indicates a corrupt connection request 110 sent by a remote BT device 104. For example, the advertising BT device 102 may detect a connection request energy level 112 that appears to be an AUX_CONNECT_REQ packet, but a valid AUX_CONNECT_REQ packet is not received by the advertising BT device 102. The presence of an AUX_CONNECT_REQ packet may be determined based on the fixed duration of the AUX_CONNECT_REQ packet. In other words, it is likely that the detected energy level corresponds to an AUX_CONNECT_REQ packet because of the timing.

The advertising BT device 102 may determine 204 that there is a failed connection attempt based on the corrupt connection request 110. Based on the detected connection request energy level 112, the advertising BT device 102 may determine 204 that one or more remote BT devices 104 sent a connection request 110. The connection request 110 sent by one remote BT device 104 may be corrupt because of interference due to another connection request 110 received from a second remote BT device 104.

The advertising BT device 102 may perform 206 connectable advertising at a faster rate to allow the remote BT device 104 to reconnect quickly. This may include sending at least one advertising packet 108 for a connection at a faster rate. In the case of BLE, the advertising packet 108 may send one or more of an ADV_EXT_IND packet on a primary advertising channel or an AUX_ADV_IND packet on secondary advertising channel at a faster rate. In an implementation, the advertising BT device 102 may perform connectable advertising at the faster rate for a limited period of time.

FIG. 3 is a diagram illustrating a channel spectrum map of BLE channels 328. 40 BLE channels 328 are shown with their corresponding center frequencies. BLE systems operate in the unlicensed 2.4 gigahertz (GHz) Industrial-Scientific-Medical (ISM) band at 2.400-2.4835 GHz. The BLE channels 328 have a 2 MHz frequency spacing. As indicated by the signal strength 330, a BLE channel 328 is strongest at the center frequency.

In BLE, there are 40 BLE channels 328. Three BLE channels 328 are BLE primary advertising channels (indicated in FIG. 3 by cross-hatching). These are channels 37, 38 and 39. Channel 37 has a center frequency of 2402 MHz. Channel 38 has a center frequency of 2426 MHz. Channel 39 has a center frequency of 2480 MHz. The remaining 37 BLE channels 328 (i.e., Channels 0-36) are data channels. These data channels may be used as secondary advertising channels in an extended advertising event.

FIG. 4 is a diagram illustrating a packet exchange for BLE connection creation on a primary advertising channel 434. When an advertising event is started, an advertising BT device 102 may transmit a first ADV_IND packet 431*a* on the primary advertising channel 434. In this example, the advertising channel index (Adv_idx) is set to 37, which corresponds to advertising channel 37.

After a period of time, a second ADV_IND packet 431*b* is sent by the advertising BT device 102. In this case, the Adv_idx is set to 38, which corresponds to advertising channel 38. This ADV_IND packet 431*b* is also sent on the primary advertising channel 434.

After a period of time (T_IFS), the remote BT device 104 may send a CONNECT_REQ packet 433 to the advertising BT device 102. In response to receiving the CONNECT_REQ packet 433, the advertising BT device 102 may transition to a connection state in the slave role. Upon receiving the CONNECT_REQ packet 433, the advertising event is closed.

It should be noted that problems with connection creation may occur if the advertising BT device 102 does not correctly receive the CONNECT_REQ packet 433. For example, two or more remote BT devices 104 may send a CONNECT_REQ packet 433 in response to the ADV_IND packet 431. Additionally, interference on the primary advertising channel 434 from other sources (e.g., WLAN transmissions) may result in a corrupt ADV_IND packet 431. The systems and methods described herein provide for an enhanced connection creation in response to a failed connection attempt.

FIG. 5 is a diagram illustrating a packet exchange for BLE connection creation on a secondary advertising channel 536. When an advertising event and extended advertising event are started, an advertising BT device 102 may transmit a first ADV_EXT_IND packet 532a. In this example, the advertising channel index (Adv_idx) is set to 37, which corresponds to advertising channel 37. The ADV_EXT_IND packet 532a is sent on the primary advertising channel 534.

After a period of time, a second ADV_EXT_IND packet 532b is sent by the advertising BT device 102. In this case, the Adv_idx is set to 38, which corresponds to advertising channel 38. This ADV_EXT_IND packet 532b is also sent on the primary advertising channel 534. Upon transmitting the ADV_EXT_IND packet 532b, the advertising event is closed.

After another period of time (≥T_MAFS), the advertising BT device 102 transmits an AUX_ADV_IND packet 538 on the secondary advertising channel 536. In this case, the first ADV_EXT_IND packet 532a and second ADV_EXT_IND packet 532b may both point to the AUX_ADV_IND packet 538 on the secondary advertising channel 536. The extended advertising event index (SAdv_idx) may be set as a function of x.

Upon receiving the AUX_ADV_IND packet 538, a remote BT device 104 may send an AUX_CONNECT_REQ packet 540 to the advertising BT device 102. In response to receiving the AUX_CONNECT_REQ packet 540, the advertising BT device 102 may send an AUX_CONNECT_RSP packet 542 confirming the connection request. The AUX_CONNECT_REQ packet 540 and the AUX_CONNECT_RSP packet 542 may be separated by a time period (T_IFS). Upon sending the AUX_CONNECT_RSP packet 542, the extended advertising event is closed.

It should be noted that problems with connection creation may occur if the advertising BT device 102 does not correctly receive the AUX_CONNECT_REQ packet 540. For example, two or more remote BT devices 104 may send an AUX_CONNECT_REQ packet 540 in response to the AUX_ADV_IND packet 538. Additionally, interference on the secondary advertising channel 536 from other sources (e.g., WLAN transmissions) may result in a corrupt AUX_CONNECT_REQ packet 540. The systems and methods described herein provide for an enhanced connection creation in response to a failed connection attempt.

Figure 6:
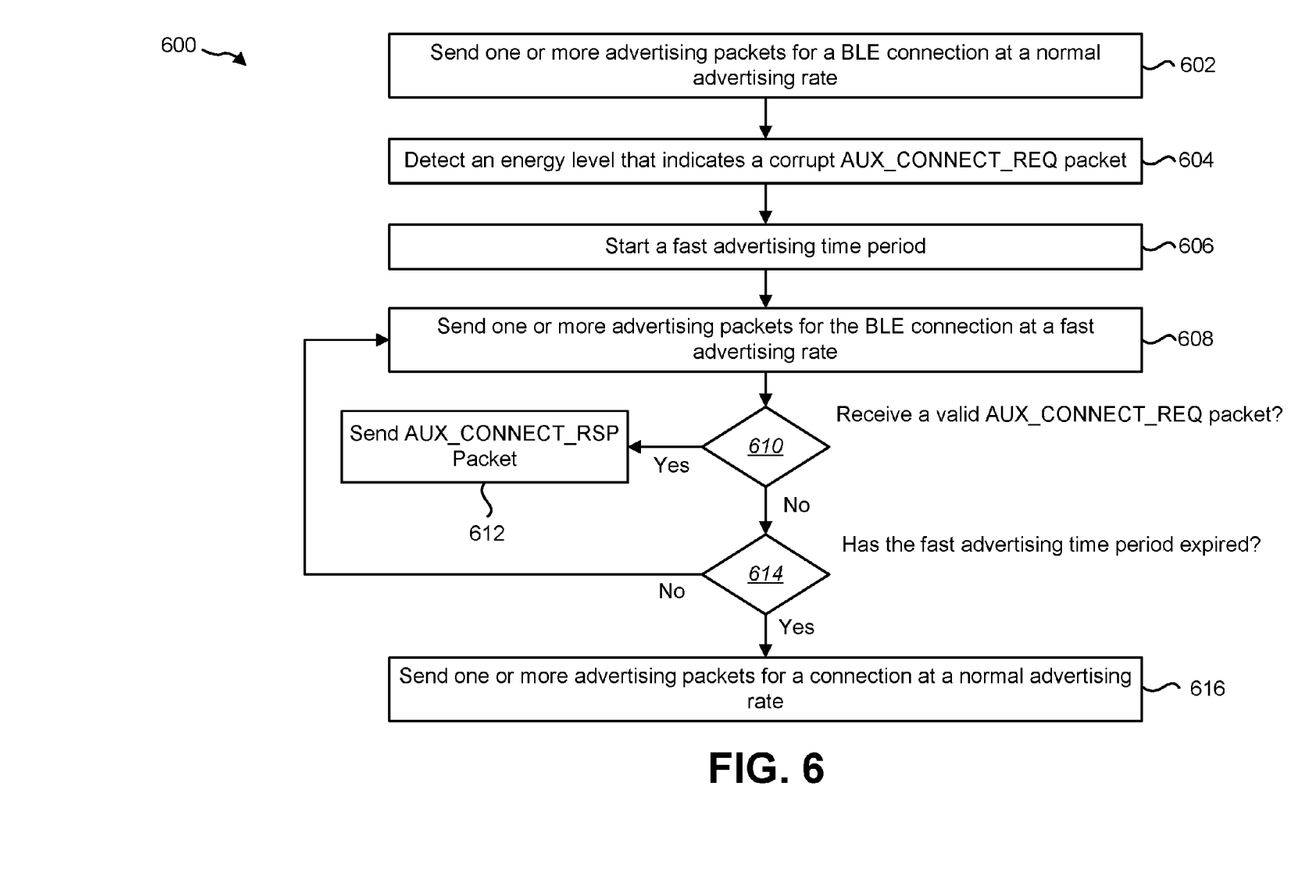
FIG. 6 is a flow diagram illustrating one configuration of a method for BLE connection creation.

FIG. 6 is a flow diagram illustrating one configuration of a method 600 for BLE connection creation. The method 600 may be performed by an advertising BT device 102.

The advertising BT device 102 may send 602 one or more advertising packets 108 for a BLE connection at a normal advertising rate 116. For example, the advertising BT device 102 may send 602 one or more ADV_EXT_IND packets 532 on a primary advertising channel 534 at a normal advertising rate 116. Additionally, the advertising BT device 102 may send 602 one or more AUX_ADV_IND packets 538 on a secondary advertising channel 536 at a normal advertising rate 116.

The advertising BT device 102 may detect 604 an energy level 112 that indicates a corrupt AUX_CONNECT_REQ packet 540. For example, the advertising BT device 102 may detect 604 a connection request energy level 112 that appears to be associated with an AUX_CONNECT_REQ packet 540. The presence of the AUX_CONNECT_REQ packet 540 may be determined based on the fixed duration and timing of the AUX_CONNECT_REQ packet 540 and/or a CRC failure.

The advertising BT device 102 may start 606 a fast advertising time period 120. For example, the advertising BT device 102 may start a counter set to the fast advertising time period 120.

The advertising BT device 102 may send 608 one or more advertising packets 108 for the BLE connection at a fast advertising rate 118. The advertising BT device 102 may switch from the normal advertising rate 116 to the fast advertising rate 118. For example, the advertising BT device 102 may send 608 one or more ADV_EXT_IND packets 532 on the primary advertising channel 534 at the fast advertising rate 118. Additionally, the advertising BT device 102 may send 608 one or more AUX_ADV_IND packets 538 on the secondary advertising channel 536 at the fast advertising rate 118.

The advertising BT device 102 may determine 610 whether it has received a valid AUX_CONNECT_REQ packet 540. For example, if the advertising BT device 102 receives an AUX_CONNECT_REQ packet 540 that passes a CRC, then the AUX_CONNECT_REQ packet 540 may be valid. Also, the AUX_CONNECT_REQ packet 540 should contain the address of the advertising BT device 102 (i.e., not addressed to some other advertiser). If the AUX_CONNECT_REQ packet 540 is valid, then the advertising BT device 102 may send 612 an AUX_CONNECT_RSP packet 542 to the remote BT device 104 that sent the AUX_CONNECT_REQ packet 540. At this point, a BLE connection may be established.

If the advertising BT device 102 determines 610 that it did not receive a valid AUX_CONNECT_REQ packet 540, then the advertising BT device 102 may determine 614 whether the fast advertising time period 120 has expired. If the fast advertising time period 120 has not expired, then the advertising BT device 102 may again send 608 one or more advertising packets 108 for the BLE connection at the fast advertising rate 118.

If the advertising BT device 102 determines 614 that the fast advertising time period 120 has expired, then the advertising BT device 102 may send 616 one or more advertising packets 108 at the normal advertising rate 116. In other words, at the end of the fast advertising time period 120, the advertising BT device 102 may switch from the fast advertising rate 118 back to the normal advertising rate 116.

Figure 7:
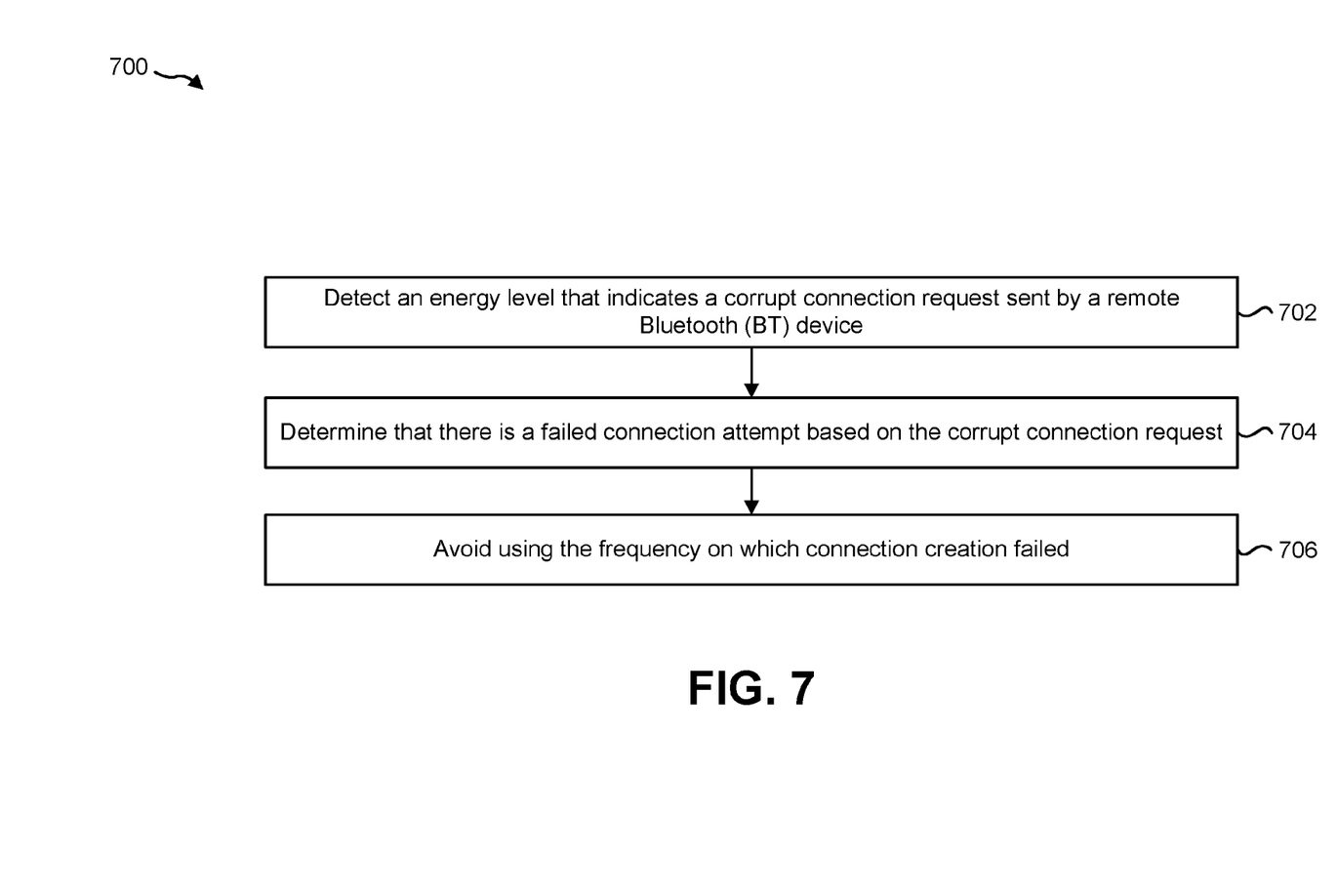
FIG. 7 is a flow diagram illustrating another configuration of a method for BLE connection creation.

FIG. 7 is a flow diagram illustrating another configuration of a method 700 for BLE connection creation. The method 700 may be performed by an advertising BT device 102.

The advertising BT device 102 may detect 702 an energy level 112 that indicates a corrupt connection request 110 sent by a remote BT device 104. For example, this may be accomplished as described in connection with FIG. 2.

The advertising BT device 102 may determine 704 that there is a failed connection attempt based on the corrupt connection request 110. For example, this may be accomplished as described in connection with FIG. 2.

The advertising BT device 102 may avoid 706 using the frequency 122 on which connection creation failed. Upon determining 704 that there is a failed connection attempt, the advertising BT device 102 may avoid 706 the current connection creation frequency 122 (e.g., the secondary advertising channel 536) for subsequent connection creation attempts. This may include switching the connection creation frequency 122 that is indicated by the ADV_EXT_IND packet 532 on the primary advertising channel 534. This may be done for a limited period time.

Figure 8:
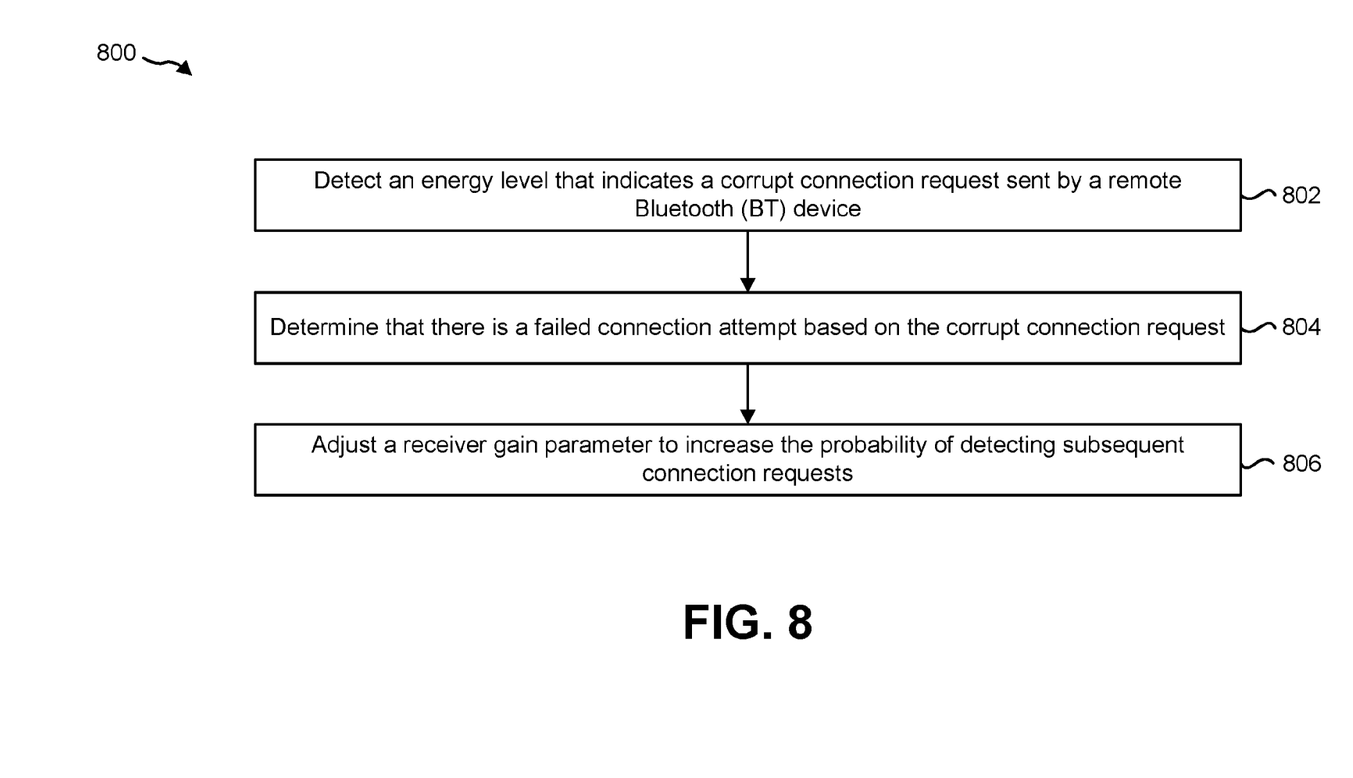
FIG. 8 is a flow diagram illustrating yet another configuration of a method for BLE connection creation.

FIG. 8 is a flow diagram illustrating yet another configuration of a method 800 for BLE connection creation. The method 800 may be performed by an advertising BT device 102.

The advertising BT device 102 may detect 802 an energy level 112 that indicates a corrupt connection request 110 sent by a remote BT device 104. For example, this may be accomplished as described in connection with FIG. 2.

The advertising BT device 102 may determine 804 that there is a failed connection attempt based on the corrupt connection request 110. For example, this may be accomplished as described in connection with FIG. 2.

The advertising BT device 102 may adjust 806 a receiver gain parameter 124 to increase the probability of detecting subsequent connection requests 110. For example, the advertising BT device 102 may temporarily increase the gain of a BT receiver to increase the likelihood that a connection request 110 sent by the remote BT device 104 is correctly received. This may be done for a limited period time.

Figure 9:
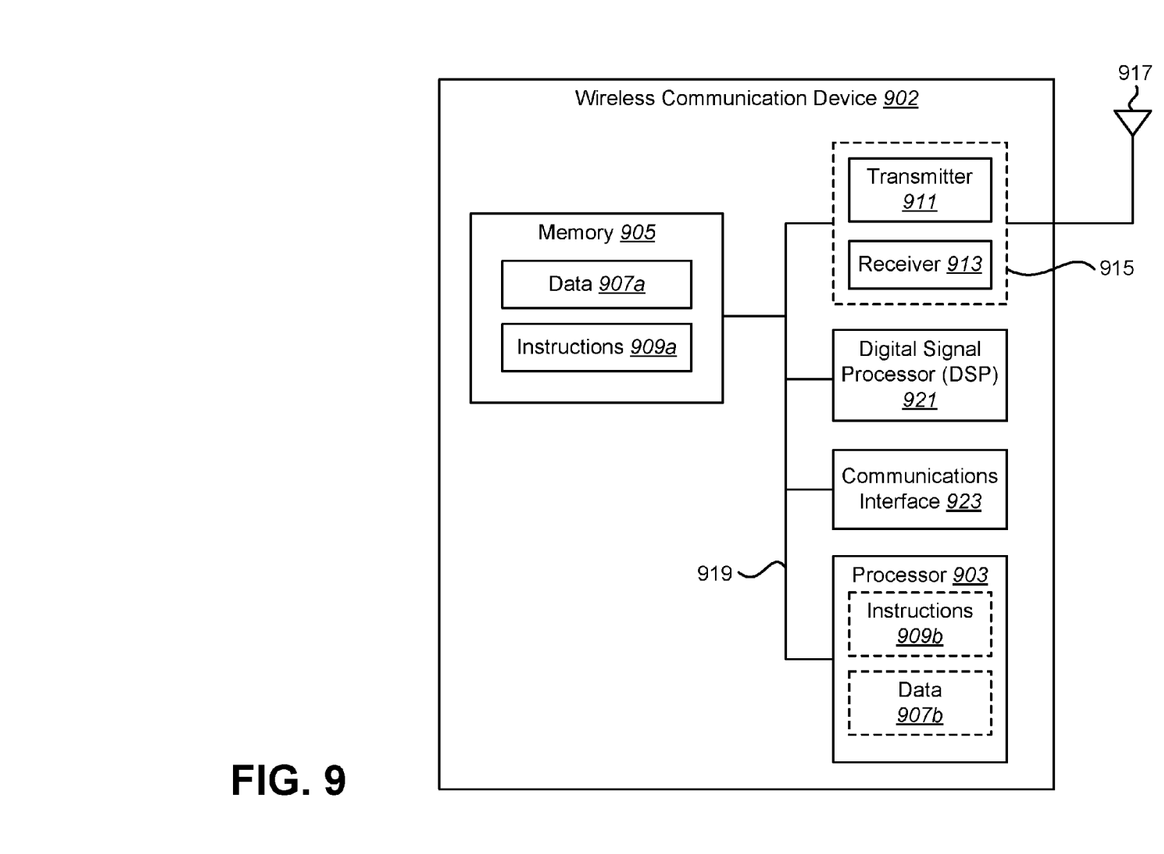
FIG. 9 illustrates certain components that may be included within a wireless communication device.

FIG. 9 illustrates certain components that may be included within a wireless communication device 902. The wireless communication device 902 described in connection with FIG. 9 may be an example of and/or may be implemented in accordance with the advertising BT device 102 described in connection with one or more of FIGS. 1-9.

The wireless communication device 902 includes a processor 903. The processor 903 may be a general purpose single- or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, etc. The processor 903 may be referred to as a central processing unit (CPU). Although just a single processor 903 is shown in the wireless communication device 902 of FIG. 9, in an alternative configuration, a combination of processors (e.g., an ARM and DSP) could be used.

The wireless communication device 902 also includes memory 905 in electronic communication with the processor (i.e., the processor can read information from and/or write information to the memory). The memory 905 may be any electronic component capable of storing electronic information. The memory 905 may be configured as random access memory (RAM), read-only memory (ROM), magnetic disk storage media, optical storage media, flash memory devices in RAM, on-board memory included with the processor, EPROM memory, EEPROM memory, registers and so forth, including combinations thereof.

Data 907a and instructions 909a may be stored in the memory 905. The instructions may include one or more programs, routines, sub-routines, functions, procedures, code, etc. The instructions may include a single computer-readable statement or many computer-readable statements. The instructions 909a may be executable by the processor 903 to implement the methods disclosed herein. Executing the instructions 909a may involve the use of the data 907a that is stored in the memory 905. When the processor 903 executes the instructions 909, various portions of the instructions 909b may be loaded onto the processor 903, and various pieces of data 907b may be loaded onto the processor 903.

The wireless communication device 902 may also include a transmitter 911 and a receiver 913 to allow transmission and reception of signals to and from the wireless communication device 902 via an antenna 917. The transmitter 911 and receiver 913 may be collectively referred to as a transceiver 915. The wireless communication device 902 may also include (not shown) multiplier transmitters, multiplier antennas, multiplier receivers and/or multiplier transceivers.

The wireless communication device 902 may include a digital signal processor (DSP) 921. The wireless communication device 902 may also include a communications interface 923. The communications interface 923 may allow a user to interact with the wireless communication device 902.

The various components of the wireless communication device 902 may be coupled together by one or more buses, which may include a power bus, a control signal bus, a status signal bus, a data bus, etc. For the sake of clarity, the various buses are illustrated in FIG. 9 as a bus system 919.

In the above description, reference numbers have sometimes been used in connection with various terms. Where a term is used in connection with a reference number, this may be meant to refer to a specific element that is shown in one or more of the Figures. Where a term is used without a reference number, this may be meant to refer generally to the term without limitation to any particular Figure.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

It should be noted that one or more of the features, functions, procedures, components, elements, structures, etc., described in connection with any one of the configurations described herein may be combined with one or more of the functions, procedures, components, elements, structures, etc., described in connection with any of the other configurations described herein, where compatible. In other words, any compatible combination of the functions, procedures, components, elements, etc., described herein may be implemented in accordance with the systems and methods disclosed herein.

The functions described herein may be stored as one or more instructions on a processor-readable or computer-readable medium. The term "computer-readable medium" refers to any available medium that can be accessed by a computer or processor. By way of example, and not limitation, such a medium may comprise Random-Access Memory (RAM), Read-Only Memory (ROM), Electrically Erasable Programmable Read-Only Memory (EEPROM), flash memory, Compact Disc Read-Only Memory (CD-ROM) or other optical disk storage, magnetic disk storage or other magnetic storage devices, or any other medium that can be used to store desired program code in the form of instructions or data structures and that can be accessed by a computer. Disk and disc, as used herein, includes compact disc (CD), laser disc, optical disc, digital versatile disc (DVD), floppy disk and Blu-ray® disc, where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed or computed by the computing device or processor. As used herein, the term "code" may refer to software, instructions, code or data that is/are executable by a computing device or processor.

Software or instructions may also be transmitted over a transmission medium. For example, if the software is transmitted from a website, server or other remote source using a coaxial cable, fiber optic cable, twisted pair, digital subscriber line (DSL) or wireless technologies such as infrared, radio and microwave, then the coaxial cable, fiber optic cable, twisted pair, DSL or wireless technologies such as infrared, radio and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method for wireless communication by an advertising Bluetooth (BT) device, comprising:
    detecting an energy level that indicates a corrupt connection request sent by a remote BT device;
    determining that there is a failed connection attempt based on the corrupt connection request, wherein determining that there is a failed connection attempt further comprises:
        establishing an access address lock on a connection request packet received from the remote BT device, and
        failing to match a cyclic redundancy check (CRC) for the connection request packet; and
    performing connectable advertising at a faster rate to allow the remote BT device to reconnect quickly.

2. The method of claim 1, wherein the connection request is made on a Bluetooth low energy primary advertising channel.

3. The method of claim 1, wherein the connection request is made on a Bluetooth low energy secondary advertising channel.

4. The method of claim 1, wherein detecting an energy level that indicates a corrupt connection request comprises detecting an energy level that indicates that a corrupt AUX_CONNECT_REQ packet was sent by the remote BT device.

5. The method of claim 4, wherein presence of an AUX_CONNECT_REQ packet is determined based on a fixed duration of the AUX_CONNECT_REQ packet.

6. The method of claim 1, wherein the connection request sent by the remote BT device is corrupt because of interference due to another connection request received from a second remote BT device.

7. The method of claim 1, wherein the advertising BT device sends one or more of an ADV_EXT_IND packet on a primary advertising channel or an AUX_ADV_IND packet on a secondary advertising channel at a faster rate.

8. The method of claim 1, wherein the connectable advertising is performed at the faster rate for a limited period of time.

9. The method of claim 1, further comprising avoiding using a frequency on which connection creation failed.

10. The method of claim 1, further comprising adjusting a receiver gain parameter to increase the probability of detecting subsequent connection requests.

11. An advertising Bluetooth (BT) device, comprising:
    a processor;
    a memory in electronic communication with the processor; and
    instructions stored in the memory, the instructions executable by the processor to:
    detect an energy level that indicates a corrupt connection request sent by a remote BT device;
    determine that there is a failed connection attempt based on the corrupt connection request, wherein the instructions executable to determine that there is a failed connection attempt further comprise instructions executable to:
        establish an access address lock on a connection request packet received from the remote BT device, and
        fail to match a cyclic redundancy check (CRC) for the connection request packet; and
    perform connectable advertising at a faster rate to allow the remote BT device to reconnect quickly.

12. The advertising BT device of claim 11, wherein the instructions executable to detect an energy level that indicates a corrupt connection request comprise instructions executable to detect an energy level that indicates that a corrupt AUX_CONNECT_REQ packet was sent by the remote BT device.

13. The advertising BT device of claim 11, wherein the advertising BT device sends one or more of an ADV_EXT_IND packet on a primary advertising channel or an AUX_ADV_IND packet on a secondary advertising channel at a faster rate.

14. The advertising BT device of claim 11, wherein the connectable advertising is performed at the faster rate for a limited period of time.

15. The advertising BT device of claim 11, further comprising instructions executable to avoid using a frequency on which connection creation failed.

16. The advertising BT device of claim 11, further comprising instructions executable to adjust a receiver gain parameter to increase the probability of detecting subsequent connection requests.

17. An apparatus for wireless communication, comprising:
    means for detecting an energy level that indicates a corrupt connection request sent by a remote BT device;
    means for determining that there is a failed connection attempt based on the corrupt connection request, wherein the means for determining that there is a failed connection attempt further comprises:
        means for establishing an access address lock on a connection request packet received from the remote BT device, and
        means for failing to match a cyclic redundancy check (CRC) for the connection request packet; and
    means for performing connectable advertising at a faster rate to allow the remote BT device to reconnect quickly.

18. The apparatus of claim 17, wherein the means for detecting an energy level that indicates a corrupt connection request comprise means for detecting an energy level that indicates that a corrupt AUX_CONNECT_REQ packet was sent by the remote BT device.

19. The apparatus of claim 17, wherein the apparatus sends one or more of an ADV_EXT_IND packet on a primary advertising channel or an AUX_ADV_IND packet on a secondary advertising channel at a faster rate.

20. The apparatus of claim 17, wherein the connectable advertising is performed at the faster rate for a limited period of time.

21. The apparatus of claim 17, further comprising means for avoiding using a frequency on which connection creation failed.

22. The apparatus of claim 17, further comprising means for adjusting a receiver gain parameter to increase the probability of detecting subsequent connection requests.

23. A computer-program product for wireless communication by an advertising Bluetooth (BT) device, the computer-program product comprising a non-transitory computer-readable medium having instructions thereon, the instructions comprising:
  code for causing the advertising BT device to detect an energy level that indicates a corrupt connection request sent by a remote BT device;
  code for causing the advertising BT device to determine that there is a failed connection attempt based on the corrupt connection request, wherein the code for causing the advertising BT device to determine that there is a failed connection attempt further comprises:
    code for causing the advertising BT device to establish an access address lock on a connection request packet received from the remote BT device, and
    code for causing the advertising BT device to fail to match a cyclic redundancy check (CRC) for the connection request packet; and
  code for causing the advertising BT device to perform connectable advertising at a faster rate to allow the remote BT device to reconnect quickly.

24. The computer-program product of claim 23, wherein the code for causing the advertising BT device to detect an energy level that indicates a corrupt connection request comprises code for causing the advertising BT device to detect an energy level that indicates that a corrupt AUX_CONNECT_REQ packet was sent by the remote BT device.

25. The computer-program product of claim 23, wherein the advertising BT device sends one or more of an ADV_EXT_IND packet on a primary advertising channel or an AUX_ADV_IND packet on a secondary advertising channel at a faster rate.

* * * * *